Figure 1:
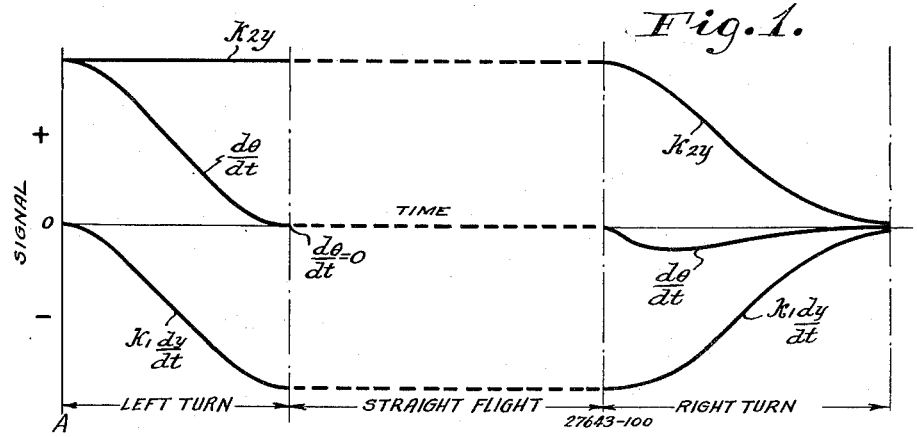

Oct. 7, 1952 — W. PALMER — 2,613,339

RADIO NAVIGATION SYSTEM FOR DIRIGIBLE CRAFT

Filed July 16, 1947 — 3 Sheets-Sheet 1

INVENTOR
WINSLOW PALMER
BY Herbert H. Thompson
his ATTORNEY

Oct. 7, 1952 W. PALMER 2,613,339
RADIO NAVIGATION SYSTEM FOR DIRIGIBLE CRAFT
Filed July 16, 1947 3 Sheets-Sheet 2

INVENTOR
WINSLOW PALMER
BY
ATTORNEY

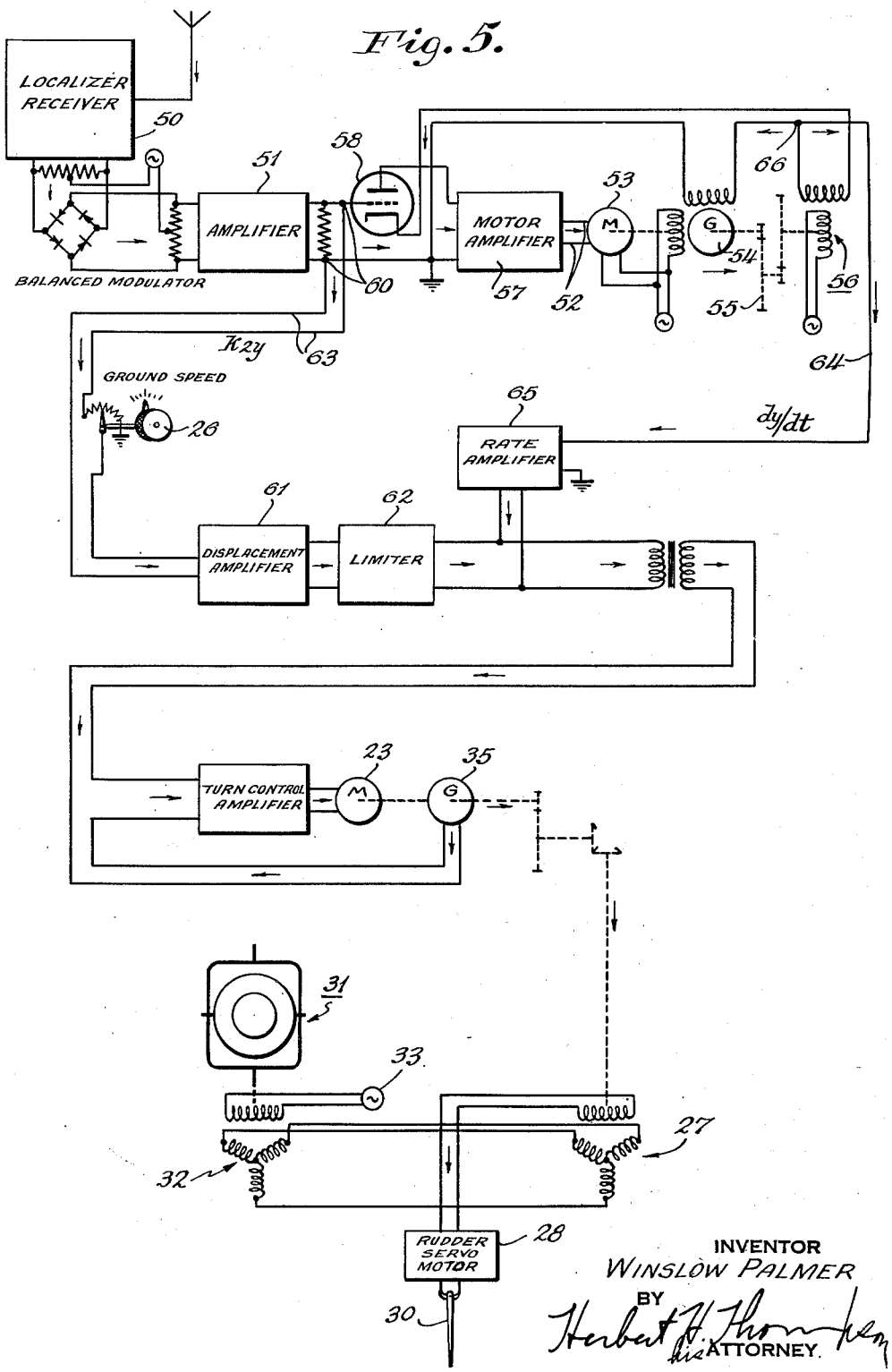

Patented Oct. 7, 1952

2,613,339

UNITED STATES PATENT OFFICE 2,613,339

RADIO NAVIGATION SYSTEM FOR DIRIGIBLE CRAFT

Winslow Palmer, West Hempstead, N. Y., assignor to The Sperry Corporation, a corporation of Delaware Application July 16, 1947, Serial No. 761,354

23 Claims. (Cl. 318—16)

This invention relates to an improvement in radio navigation systems for dirigible craft. More particularly, the invention concerns a system of a character in which the rate of turn of the craft toward a desired line of position is made proportional to the sum of the distance between the craft and the desired line of position, and the rate of change of such distance or the velocity of the craft relative to the line of position. In accordance with the invention, means are provided for producing a signal proportional to the difference or error between the desired radio line of position and the line of position defined by the radio means within the craft and means are provided for changing the direction of movement of the craft in accordance with the combined signals of the signal means and the first derivative thereof. The system of the present invention is particularly adapted to control the craft to make a proper approach to a radio defined line of position from a starting position and heading that are entirely unrelated to the line.

In such a control system $-d\theta/dt = k_2 y + k_1 dy/dt$ where $\theta$ is the angle between the fore and aft axis of the craft and the line of position, $t$ is time, $y$ is the perpendicular distance to the distant radio defined line of position and $k_1$, $k_2$ are constants. The instantaneous value of $\theta$ is found by integrating the noted equation, the same then assuming the form $\theta = K_2 \int y dt + k_1 y$ so that the angle $\theta$ at any instant is proportional to the perpendicular distance of the craft from the line of position or the error in the position of the craft plus the time integral of the error.

In this type of system, with the craft distant from the line there is a large $k_2 y$ signal. At this instant, say $t=0$, the $k_1 dy/dt$ is zero and the heading of the craft is parallel to the line. As the craft starts turning toward the line, due to the $k_2 y$ signal, a $k_1 dy/dt$ signal appears of an amplitude depending on the instantaneous angle $\theta$. At some course angle $\theta_1$ the $k_2 y$ signal is equal and opposite to the $k_1 dy/dt$ signal so that $d\theta/dt$ is zero and the turning of the craft stops. If the $k_1 dy/dt$ signal becomes larger than the $k_2 y$ signal, the turning of the craft is reversed and as a result of these factors, the craft approaches the line asymptotically. The relative values of $k_1$ and $k_2$ are selected so as to cause the craft to seek the distant radio defined line in a substantially dead-beat manner. If $k_1$ is too small relative to $k_2$, the craft tends to overshoot the line as then $-d\theta/dt = k_2 y$ approximately and since $y$ does not change sign until the line of position is crossed neither would $d\theta/dt$ change sign to reverse the craft's direction of approach. On the other hand if $k_2$ is zero, then $-d\theta/dt = k_1 dy/dt$ and the craft would settle on any line parallel to the desired line.

In this type of system, if the craft is too far away from the desired line of position when the control is turned on, it would not seek the line. The velocity of the craft relative to the distant line of position $(dy/dt)$ is proportional to the ground speed of the craft and the sine of the angle between the craft and the line of position. The maximum value for $dy/dt$ is when the craft is traveling perpendicularly toward the line when $$\frac{dy}{dt}=V$$

If the craft is so far off the desired line that the $k_1 dy/dt$ signal is negligible compared to the $k_2 y$ signal the relation $-d\theta/dt = k_2 y + k_1 dy/dt$ reduces itself to $-d\theta/dt = k_2 y$, that is, a constant rate of turn is set up and the craft turns in a circle indefinitely.

An object of the invention is to provide a navigation system of the character described wherein the tendency of the craft to circle or turn at a constant rate when very distant from the desired line is corrected.

A further object of the invention is to utilize a system of the type described that controls the craft so that the same approaches the radio defined line of position from a remote point to a predetermined distance from the line at a constant angle $\theta$ or with a fixed heading.

Another object of the present invention is to provide a new and improved system for automatically navigating a craft to a predetermined course.

Another object of the present invention is to provide a new and improved system and, specifically, a radio navigation system for automatically navigating a craft to a predetermined position.

Another object of the present invention is to provide new and improved craft navigating means and also radio-responsive craft navigating means, comprising means to produce a signal proportional to the displacement of said craft from a predetermined course, and means to produce a signal proportional to the derivative of said displacement.

Another object of the present invention is to provide new and improved craft navigating means comprising means to produce signals proportional to displacement from a predetermined course and the derivative of said displacement, and means to limit said displacement signal.

Another object of the present invention is to provide in a system for navigating a dirigible craft, radio means for supplying a signal output corresponding to the geographical position of the craft, settable means for supplying a signal output corresponding to a selected future position of the craft, and means for controlling the heading of the craft in accordance with both of said signals.

Another object of the present invention is to provide in a system for navigating a dirigible craft, radio receiver means of the loran type for providing an output corresponding to the present line of position of the craft, settable means for establishing a reference corresponding to a selected line of future position of the craft, and means responsive to the difference between the output of said receiver and said reference for controlling the heading of the craft.

Another object of the present invention is to provide in a navigation system for dirigible craft, radio receiver means, means including manually settable means cooperable with the output of said radio means for providing a signal proportional to the distance of the craft from a predetermined radio defined ground track, rate measuring means for providing a signal proportional to the rate of approach of said craft to said ground track, means for limiting the maximum signal derived from said second mentioned means to a value not in excess of the maximum rate of approach signal derivable from said rate measuring means, craft steering means, and means responsive to the algebraic sum of said signals for controlling the craft steering means.

One of the features of the invention is provided by a means for limiting the amplitude of the $k_2y$ signal to correspond with the maximum amplitude of the $k_1 dy/dt$ signal possible for the craft.

Figure 2:
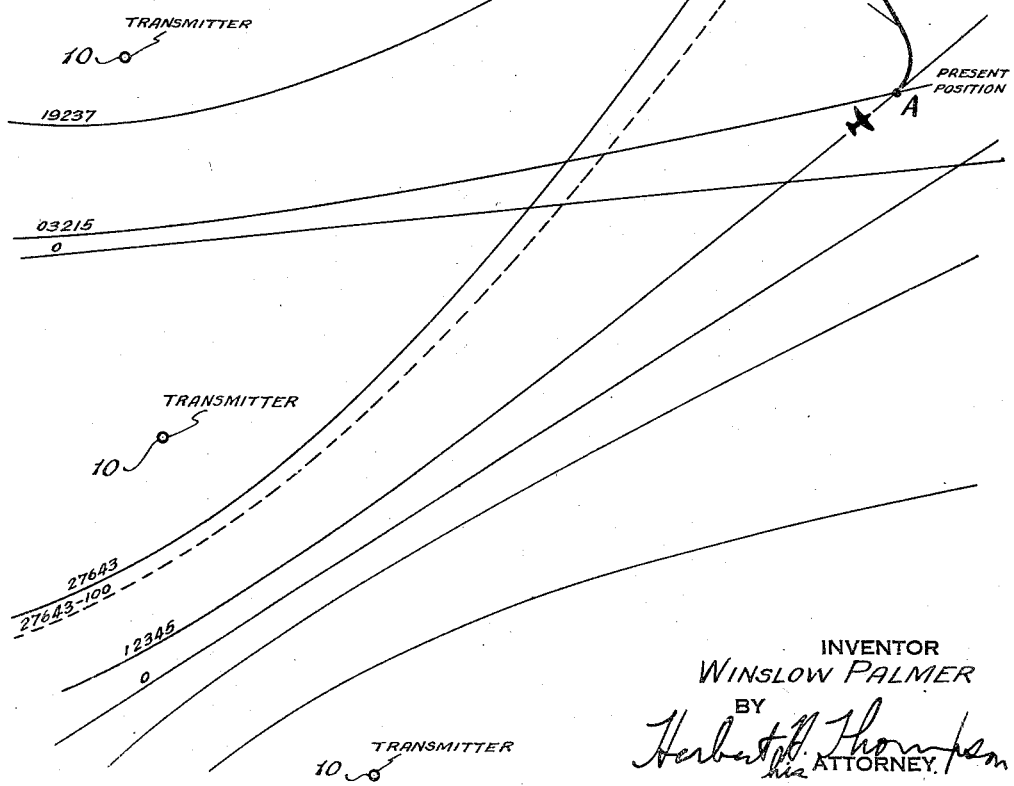
Figure 3:
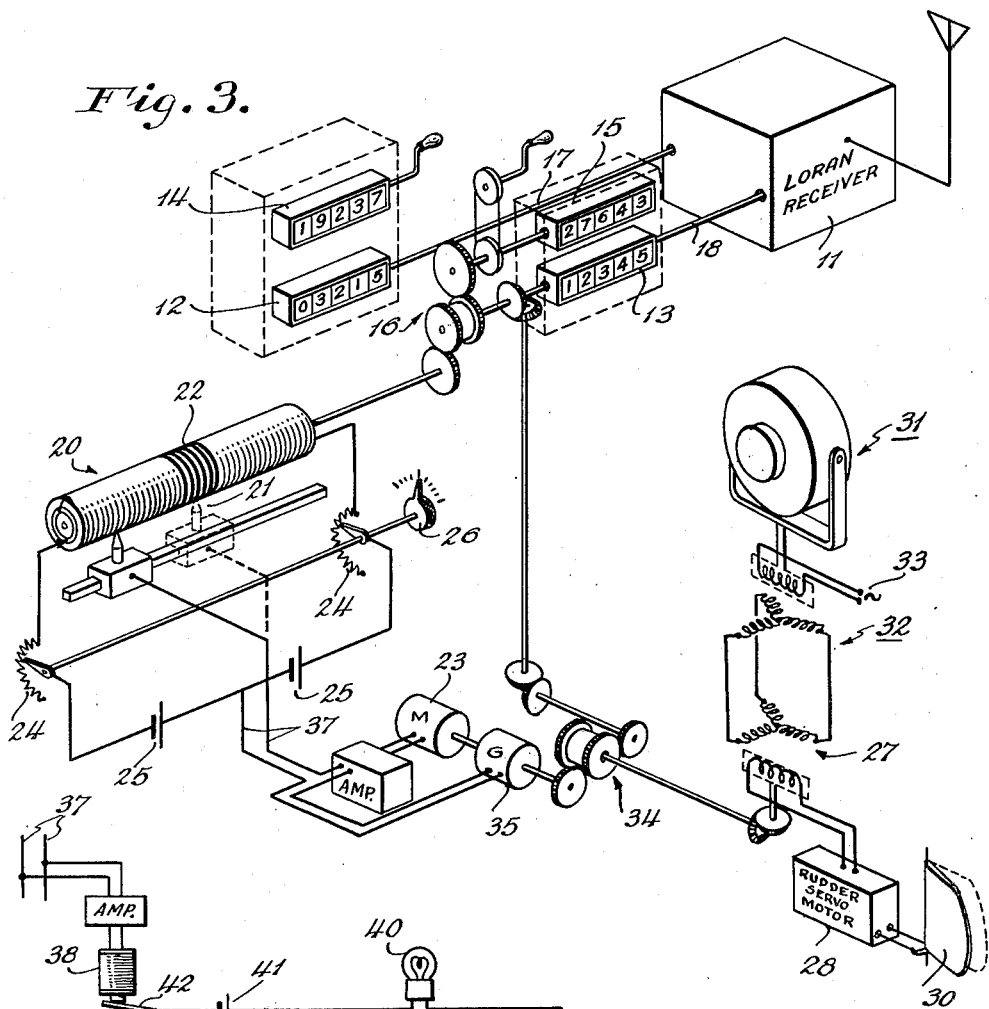
Figure 4:
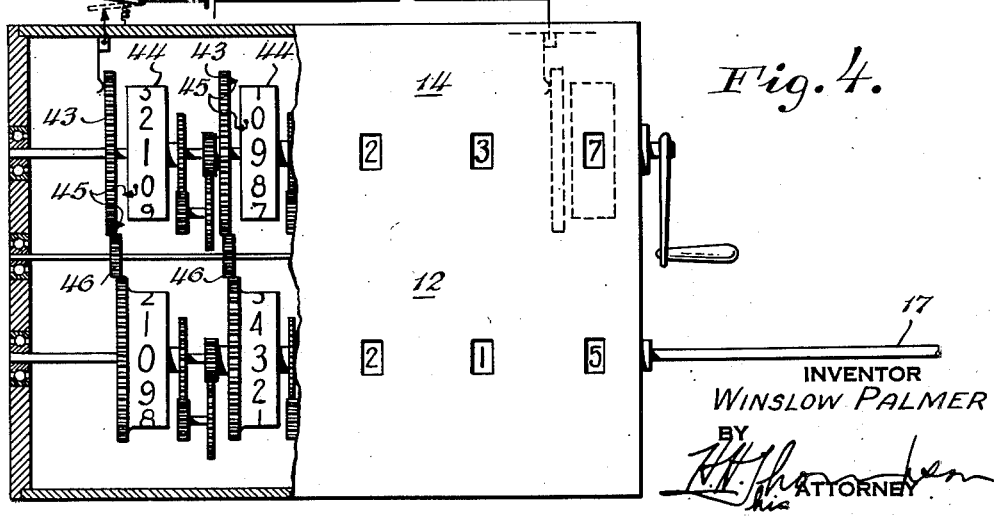

Other objects, features and structural details of the invention will be apparent from the following description when read in relation to the accompanying drawings, wherein Fig. 1 is a graph employed in explaining the principles of the present invention, Fig. 2 is a diagrammatic view showing the course of the craft between two radio defined lines of position, Fig. 3 is a schematic view and wiring diagram illustrating the components of a radio navigation system embodying the present inventive concepts, Fig. 4 is a detail view and wiring diagram of one of the alarm circuits employed in the improved system, and Fig. 5 is a schematic view showing a modified form of the improved system.

The radio portion of the improved system may be of the character known as a "loran system" such as described in "Electronics" magazine of November 1945 wherein there is provided means for determining the position of a mobile craft by obtaining radio signals at the craft from a plurality or chain of ground transmitters and measuring the time differences of reception at the craft of the radio signals from any two stations. In the present showing, three ground stations are indicated in the drawing at 10. The radio receiver of such a system is designated at 11, in Fig. 3. As shown, receiver 11 is an automatically indicating type of "loran" receiver having digital counters or indicators 12 and 13 that designate the present position of the craft. The receiver 11 comprises two units of the type shown in Fig. 3—11, page 3—10, section 3, and in Fig. 4—33, page 4—34, section 4, of a publication entitled "Instruction Book for Loran Receiving Equipment—Model DBE," approved June 27, 1945. One type of automatic loran system which may be employed in connection with the embodiment of my invention shown in Fig. 3 is that fully disclosed in U. S. Patent No. 2,472,129, issued to E. C. Streeter, Jr., and assigned to the assignee of the present invention. In Fig. 2, this position is shown at A at the intersection of the lines of position —03215— and —12345— corresponding to the designations of the respective counters 12 and 13. A future or target position setting may be made by means of manually settable digital counters or indicators 14 and 15. The shafts 17 and 18 that turn the respective counters 12 and 13 are actuated by suitable phase shifting means (not shown) in receiver 11 and the counters are turned through many revolutions when the craft approaches a line of position that is distant from its present position. Position B in Fig. 2 is designated as the target position or desired future position of the craft. This position is determined by the intersection of "loran" lines —19237— and —27643— and the counters in Fig. 3 are indicated as manually set at this selected future position of the craft. The setting of counters 14 and 15 to the position shown is made when the craft is at position A. The previous settings of the counters 14 and 15 could have been —03215— and —12345— the position A of the craft in Fig. 2.

As herein shown, shaft 18, rotates a potentiometer 20 by way of differential 16. Shaft 18 drives the planetary arm of differential 16. One of the input gears of differential 16 is set by the setting means for counter 15. This gear is free of shaft 18. The output arm of the differential 16 is connected by a suitable gear to the potentiometer 20. Potentiometer 20 consists of a threaded cylinder that engages a slider 21 to move the same along its axis of rotation. The pitch of the threads on the cylinder is uniform throughout its length. A continuous wire is wound in the threads of the cylinder the respective end portions of which are made of copper or other good electrical conducting material and the central portion of which is made of resistive wire. The cylinder of the potentiometer is constructed of insulating material. The central resistance portion of the potentiometer is indicated at 22. In the dotted line position shown in Fig. 3, the conducting slider 21 has equal lengths of resistance wire to the right and left of the same. In this arrangement, the slider of the potentiometer is illustrated in the central arm of an electrical bridge whose output controls the direction of operation of a motor indicated at 23. The other arms of bridge include potentiometers 24 and batteries 25. The sliding arm of each of potentiometers 24 is adjusted in accordance with ground speed of the craft. As herein shown, a manually settable knob 26 is employed for this purpose.

Motor 23 is adapted to rotate the rotor of the turn control selsyn of a conventional yaw axis controlling automatic pilot. As shown in Fig. 3, the turn control selsyn is indicated at 27, the same providing a signal to operate a rudder servomotor 28 that in turn moves the rudder 30 of the craft to cause the same to yaw or turn about its vertical axis. The automatic pilot may also include a vertical reference in the form of a directional gyro 31 having a selsyn pickoff 32 one of whose parts is fixed to the gimbal ring of the reference. The selsyns 32 and 27 are interconnected as shown and are energized by a source of alternating current electrical energy indicated at 33. This provides a self synchronous data transmission system that provides an output to drive motor 28 when the rotors of either of the selsyns are out of positional agreement.

Motor 23 is connected to selsyn 27 through a differential 34. The motor drives one of the input gears of the differential. The other of the input gears of differential 34 is driven from shaft 18 by suitable gearing as illustrated in Fig. 3. The planetary arm of the differential 34 is connected by way of suitable gearing to the selsyn 27.

A feedback for motor 23 may be provided by means of a generator 35 and amplifier 36. This feedback ensures that the speed of the motor 23 is always proportional to the signal from potentiometer 20.

The operation of the system is as follows: At point A, the counters 14 and 15 are turned manually to the indications noted thereon in Fig. 3 to determine the target or desired future position of the craft. This moves slider 21 to a position such as its full line position in Fig. 3 and due to the unbalance in the bridge circuit a voltage appears across leads 37 that causes the motor 23 to operate to turn the craft to direct the same towards the desired target. The bridge circuit described provides a means for providing a signal in accordance with the perpendicular distance of the craft from the distant line of position defined by the radio line —27643—. This signal is represented in Fig. 1 by the designation $k_2y$. Means are also included to provide a signal in accordance with the rate of change of the perpendicular distance of the craft from the distant line of position in the form of the output of shaft 18 which drives the second input element of differential 34. This signal is represented by the designation $k_1dy/dt$ in Fig. 1. By means of potentiometers 20, 24 and knob 26, in particular the nonlinear feature of potentiometer 20, the system also includes means for limiting the $k_2y$ signal to an amplitude not greater than the maximum amplitude of the $k_1dy/dt$ signal. Accordingly as shown in Figs. 1 and 2 the craft turns until $d\theta/dt$ is zero and the differential 34 provides zero output for selsyn 27. This causes the craft to approach the radio defined line of position to a predetermined distance from the line at a fixed heading or with a constant angle $\theta$ between the longitudinal axis of the craft and the radio defined line of position —27643—. During this time of the approach the input elements of differential 34 are turning equally in opposite directions so that the output of the differential is zero. When shaft 18 has moved slider 21 to the resistive section 22 of potentiometer 20, the signal $k_2y$ then diminishes as indicated in Fig. 1. This occurs at a predetermined distance from line —27643— such as line —27543—. The craft then starts turning again as the differential 34 produces an output of a sense opposite to that of the turn beginning the approach. The craft then approaches the line asymptotically. When point B is reached the reading of digital counter 13 will be —19237—. The angle $\theta$ is defined by the magnitude of the limit and may be arbitrarily set at any value.

The improved system includes alarm means operable when the indications of the respective counters 14, 12 and 15, 13 are in agreement. The alarm means is shown in Fig. 4. This means may comprise a circuit in parallel to potentiometer output leads 37 which includes a relay 38 that is in an energized position as long as current flows in leads 37. Relay 38 controls a second circuit with an alarm device such as a light 40 and a battery 41 therein. When the relay 38 is deenergized with no current flowing in leads 37, its armature 42 drops to the dotted line position shown in Fig. 4 to close the alarm circuit with the battery 41 and lamp 40 therein. Each of the counter wheels in counter 14 has a gear 43 which is free to rotate independently thereof. The gears 43 are insulated from the respective wheels 44 and there are contacts 45 therebetween which engage to close the circuit at one position of each of the gears 43 and wheels 44. The gears 43 are driven from counter 12 by gears 46 and the respective contacts 45 engage when the sets of wheels in counter 14 and 12 read the same. At this time, the circuit is completed through battery 41 and the lamp 40 is illuminated to indicate that the craft has reached line —19237— on which target 13 is located.

In use in hyperbolic radio navigation systems where the craft is following a radio line of position such as line —12345— if the craft departs from the line for any reason shaft 18 moves the potentiometer 20 and differential 34. This produces a signal from potentiometer 20 in accordance with the time difference between the set reference line of position and the actual line of position of the craft. The direct movement of differential 34 from shaft 18 provides a signal in accordance with the first derivative of the signal produced by the bridge circuit. Both signals are combined by the differential gear 34 to change the heading of the craft to restore the same to the defined radio position of flight.

With reference to Fig. 5, a modification of the invention is shown in which the same is adapted for use in a radio approach system utilizing a localizer beam. In this system a signal is obtained from a radio receiver 50 by way of a balanced modulator and amplifier 51 that corresponds to the signal $k_2y$ or distance from the radio defined line of position. This signal is differentiated and the algebraic sum of the signals is applied to operate motor 23 to turn the rotor of selsyn 27. As shown, the modulated, amplified localizer signal at 52 is caused to turn a motor 53 which drives a generator 54 and through reduction gearing 55 a selsyn signal generator 56. The outputs of the generator 54 and of the selsyn 56 are fed back to the input of the motor amplifier 57 by way of vacuum tube 58. The displacement signal $y$ is tapped at 60 and is fed motor 23 by way of amplifier 61 and a signal limiter 62. Tube 58 prevents the feedback from generator 54 and selsyn 56 from entering the leads 63 carrying the displacement signal. The rate signal obtained from generator 54 is fed to motor 23 by way of lead 64 and the rate amplifier 65.

In operation, with the signal from the receiver 50 changing, the motor 53 is energized and thereby turns. The feedback from selsyn 56 tends to cancel the applied signal. Thus when the localizer signal becomes constant the motor 53 stops as selsyn 56 is run to a point where its output balances the localizer signal input. The angular position of selsyn 56 is thus proportional to $k_2y$ while the speed of rotation thereof is proportional to $k_1dy/dt$. The output voltage of generator 54 which is proportional to $k_1dy/dt$ is supplied lead 64 at the connection 66.

The function of limiter 62 in the displacement circuit is the same as that of limiting means provided in Fig. 3 heretofore described.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

This application contains certain features in common with applications of Gregor L. Lang, for Radio Navigation Device, Serial No. 27,732, filed May 18, 1948, and Spencer Kellogg, 2nd, for Flight Indicating System for Dirigible Craft, Serial No. 15,064, filed March 16, 1948, assigned to the same assignee as this application, and all of which are issuing concurrently.

What is claimed is:

1. A radio navigation system for dirigible craft comprising radio means defining a line of position distant from the craft, means for providing a first signal in accordance with substantially the perpendicular distance of the craft from the line of position defined by said radio means, means for providing a second signal in accordance with the rate of change of the perpendicular distance of the craft from the line of position defined by said radio means, steering means on the craft for directing the longitudinal axis thereof operated by the combined signals of said first and second signal means, and means for limiting the signal of said first signal means to an amplitude equal to or less than the maximum amplitude of the signal derivable from said second signal-providing means.

2. A system as claimed in claim 1, in which said limiting means is settable in accordance with the speed of the craft relative to the ground.

3. A radio navigation system for dirigible craft comprising radio means defining a line of position distant from the craft, means for providing a first signal in accordance with the perpendicular horizontal distance of the craft from the radio defined line of position, means for providing a second signal in accordance with the rate of change of the horizontal distance of the craft from the radio defined line of position, means for turning the craft in azimuth operated by the combined signals of said first and second signal means, and means for limiting the signal of said first signal means to an amplitude not greater than the maximum amplitude of the signal derivable from said second signal-providing means.

4. Apparatus as claimed in claim 3, in which said limiting means is settable in accordance with the ground speed of the craft.

5. In a system for navigating a craft toward a distant radio defined line of position, means for varying the angle between the longitudinal axis of the craft and the line of position, means for operating said varying means by providing a signal in accordance with the rate of change of the perpendicular distance of the craft from the line of position, second means for operating said varying means providing a signal proportional to the distance from said craft to the radio defined line and in opposition to the signal of said first signal means, and means for limiting the maximum value of the signal of said second signal means to an amplitude equal to or less than the maximum amplitude of the signal derivable from said first signal means.

6. In a radio navigation system for dirigible craft, the combination of, radio means defining a line of position, settable means for determining a reference line of position, means for producing a signal in accordance with the error between the set line of position and the actual line of position of the craft defined by said radio means, and means for controlling the direction of movement of the craft in accordance with said signal and the first derivative thereof.

7. In a hyperbolic radio navigation system for dirigible craft, the combination of, radio means defining a line of position, settable means for determining a reference line of position, means for producing a signal in accordance with the time difference between the set reference line of position and the actual line of position of the craft defined by said radio means, and means for controlling the heading of the craft in accordance with said signal.

8. In a navigation system for dirigible craft, radio receiver means, means including manually settable means cooperable with the output of said radio means for providing a signal proportional to the distance of the craft from a predetermined radio defined ground track, rate measuring means for providing a signal proportional to the rate of approach of said craft to said ground track, means for limiting the maximum signal derived from said second mentioned means to a value not in excess of the maximum rate of approach signal derivable from said rate measuring means, craft steering means, and means responsive to the algebraic sum of said signals for controlling the craft steering means.

9. In a navigation system for dirigible craft, means including radio receiver means for providing a signal output proportional to the distance of said craft from a predetermined radio defined ground track, rate measuring means for providing a signal proportional to the rate of approach of said craft toward said ground track, means for limiting the maximum signal derived from said first mentioned means to a value not in excess of the maximum rate of approach signal derivable from said rate measuring means, craft steering means, and means responsive to the algebraic sum of said signals for controlling the craft steering means.

10. In a navigation system for dirigible craft, means including radio receiver means for providing a signal output proportional to the distance of said craft from a predetermined radio defined ground track, means for limiting the maximum signal output from said first mentioned means to a predetermined value, craft steering means, means for controlling said craft steering means in accordance with the value of said signal, and means for supplying a signal dependent upon the heading of said craft toward said ground track in opposing relation to the first mentioned signal.

11. In a system for navigating a dirigible craft, means including radio receiver means for providing a signal output proportional to the distance of said craft from a predetermined radio ground track, craft steering means, means for controlling said craft steering means in accordance with said signal output, and means for limiting the maximum value of the signal output of said receiver means to some predetermined value to thereby prevent the craft steering means from causing the craft to turn to such an extent that its heading will pass through a heading normal to the radio defined ground track.

12. In a system for navigating a dirigible craft, radio receiver means for supplying a signal output corresponding to the geographical position of the craft, the signal being of the same value for all points along a known ground track, means for obtaining a signal corresponding to that obtained from said radio receiver means when at a selected ground track toward which the craft is to be navigated, means responsive to both of said means for producing a control signal proportional to the geographical distance between said ground tracks, and means for controlling the heading of the craft in accordance with said control signal.

13. In a system for navigating a dirigible craft, radio receiver means for supplying a signal output corresponding to the geographical position of the craft, the signal being of the same value for all points along a known ground track, means for obtaining a signal corresponding to that obtained from said radio receiver means when at a selected ground track toward which the craft is to be navigated, means responsive to both of said means for producing a control signal proportional to the geographical distance between said ground tracks, means for obtaining a second control signal proportional to the rate of approach of the craft toward the selected ground track, and means for controlling the heading of said craft in accordance with the difference between said two control signals.

14. In a system for navigating a dirigible craft, radio receiver means for supplying a signal output corresponding to the geographical position of the craft, the signal being of the same value for all points along a known ground track, means for obtaining a signal corresponding to that obtained from said radio receiver means when at a selected ground track toward which the craft is to be navigated, means responsive to both of said means for producing a control signal proportional to the geographical distance between said ground tracks, means for obtaining a second control signal proportional to the rate of approach of the craft toward the selected ground track, means for limiting the first control signal to a maximum value not in excess of the maximum derivable rate of approach signal, and means for controlling the heading of the craft in accordance with the difference between said two control signals.

15. In a navigation system for dirigible craft, radio receiver means for supplying a signal output corresponding to the geographical position of the craft, the signal being of the same value for all points along a known ground track, means for obtaining a signal corresponding to that obtained from said radio receiver means when at a selected ground track toward which the craft is to be navigated, means for combining said signals to provide a control signal proportional to the difference between said two signals, means for limiting the maximum value of the signal derived from said second mentioned means, craft steering means, and means for controlling the craft steering means to change the heading of said craft through an angle proportional to said control signal.

16. In a navigation system for dirigible craft, radio receiver means for supplying a signal output corresponding to the geographical position of the craft, the signal being of the same value for all points along a known ground track, means for obtaining a signal corresponding to that obtained from said radio receiver means when at a selected ground track toward which the craft is to be navigated, means for rotating a first member at a rate proportional to said second mentioned signal, a second member rotated by the output of said radio receiver means, a differential having said members connected as inputs thereto, a signal generator driven by the output of said differential, and means responsive to the output of said signal generator for steering said craft.

17. In a navigation system for dirigible craft, a first means including a radio receiver for providing an output varying with changes in position of the craft relative to a radio transmitting station, a second means comprising said radio receiver and a settable means for providing an output proportional to the distance of the craft from a selected radio-defined ground track, a differential means connecting the outputs of said first and second means as inputs to said differential, craft steering means, and means responsive to the output of said differential for controlling said craft steering means.

18. In a navigation system for dirigible craft, radio receiver means for supplying a signal output corresponding to the geographical position of the craft, the signal being of the same value for all points along a known ground track, means for producing a signal in accordance with the error between the line of actual position of the craft as defined by said radio means and some selected line of future position, means for obtaining a signal proportional to the rate of approach of the craft toward the selected line of position, and means for controlling the heading of said craft in accordance with both signals.

19. In a navigation system for dirigible craft, radio receiver means for supplying a signal output corresponding to the geographical position of the craft, the signal being of the same value for all points along a known ground track, means for producing a signal in accordance with the error between the line of actual position of the craft as defined by said radio means and some selected line of future position, means for limiting the maximum value of the error signal, means for obtaining a signal proportional to the rate of approach of the craft toward the selected line of position, and means for controlling the heading of said craft in accordance with both signals.

20. In a system for navigating a dirigible craft, radio means for supplying a signal output corresponding to the geographical position of the craft, settable means for supplying a signal output corresponding to a selected future position of the craft, and means for controlling the heading of the craft in accordance with both of said signals.

21. In a system for navigating a dirigible craft, radio receiver means of the loran type for providing an output corresponding to the present line of position of the craft, settable means for establishing a reference corresponding to a selected line of future position of the craft, and means responsive to the difference between the output of said receiver and said reference for controlling the heading of the craft.

22. In a system for navigating a dirigible craft, radio receiver means of the loran type for providing an output corresponding to the present line of position of the craft, settable means for establishing a reference corresponding to a selected line of future position of the craft, and means responsive to the difference between the output of said receiver and said reference for controlling the heading of the craft, means for supplying a signal proportional to the difference between the output of said receiver and said reference, and means responsive to both of said signals for controlling the heading of said craft.

23. In a navigating system for dirigible craft, radio means for providing a signal proportional to the displacement of a craft from a radio defined path, a directional reference device and a signal-generating pick-off associated therewith, means responsive to the signal derived from said pick-off for controlling the heading of the craft, and means responsive to the signal derived from said radio receiver for modifying the signal derived from said pick-off.

WINSLOW PALMER.

REFERENCES CITED

The following references are of record in the file of this patent:

UNITED STATES PATENTS

| Number | Name | Date |
| --- | --- | --- |
| 1,077,965 | Pollen et al. | Nov. 4, 1913 |
| 1,260,303 | Belin | Mar. 26, 1918 |
| 2,173,841 | Hooven | Sept. 26, 1939 |
| 2,372,185 | Wittkuhns | Mar. 27, 1945 |
| 2,403,152 | Roters | July 2, 1946 |
| 2,423,337 | Moselay | July 1, 1947 |